United States Patent [19]

Beigang

[11] Patent Number: 5,333,711
[45] Date of Patent: Aug. 2, 1994

[54] FREEWHEELING DEVICE FOR FOUR WHEEL DRIVE VEHICLES

[75] Inventor: Wolfgang Beigang, Ruppichteroth, Fed. Rep. of Germany

[73] Assignee: GKN Automotive AG, Siegburg, Fed. Rep. of Germany

[21] Appl. No.: 7,632

[22] Filed: Jan. 21, 1993

[30] Foreign Application Priority Data

Jan. 27, 1992 [DE] Fed. Rep. of Germany ....... 4202086

[51] Int. Cl.$^5$ .................. F16D 11/00; F16D 15/00; F16D 41/04; F16D 43/04
[52] U.S. Cl. .................. 192/71; 192/48.6; 192/48.92; 192/93 C; 192/104 B; 192/89.28
[58] Field of Search ............... 180/248, 249; 192/104 B, 104 C, 104 R, 93 C, 71, 57, 48.6, 48.92, 89 CT

[56] References Cited

U.S. PATENT DOCUMENTS

| | | | |
|---|---|---|---|
| 4,723,624 | 2/1988 | Kawasaki et al. | 180/249 X |
| 4,889,353 | 12/1989 | Hamada et al. | 180/248 X |
| 5,007,498 | 4/1991 | Weise et al. | 180/249 X |
| 5,156,247 | 10/1992 | Weise et al. | 180/248 X |
| 5,273,147 | 12/1993 | Beigang et al. | 192/104 B |
| 5,279,402 | 1/1994 | Beigang | 192/71 X |

FOREIGN PATENT DOCUMENTS 866046 4/1961 United Kingdom ............ 192/104 R

Primary Examiner—Rodney H. Bonck
Attorney, Agent, or Firm—Harness, Dickey & Pierce

[57] ABSTRACT

A freewheeling device (11) for torque transmitting purposes at small numbers of revolutions, e.g. at low driving speeds, has two freewheeling parts (14, 17) connected via locking members (25). The locking members (25) engage apertures (24) of one of the freewheeling part (17) and recess (26) of the other freewheeling part (14). If a certain speed of the two freewheeling parts (14, 17) is exceeded, one freewheeling part (14) may overtake the other freewheeling part (17). Switching is effected via a switching cage (29) loaded by centrifugal masses (33) and which moves a switching element (30) into the released position. A spring (36) ensures the transfer into the locked position. A synchronizing device (38) is provided in order to ensure that a transfer into the locked position takes place only at small speed differentials between the two freewheeling parts (14, 17). The synchronizing device (38) has a driving member (44) which, in the released position, is supported on a rotary ramp (43) in a force-locking way. In the locked position, the driving member (44) may engage an axial groove (41). The releasing enables axial displacement of the switching member and thus transfer of the locking members (25) into the locked position.

11 Claims, 4 Drawing Sheets

FREEWHEELING DEVICE FOR FOUR WHEEL DRIVE VEHICLES

BACKGROUND OF THE INVENTION

The present invention relates to a lockable freewheeling device and, more particularly, to a device which provides a driving connection between non-permanently driven wheels of the rear axle and permanently driven wheels of the front axle of a motor vehicle.

The device includes two freewheeling parts. One of the freewheeling parts is driven and the other one is intended to pass on the rotational movement. One of the freewheeling parts includes a sleeve-shaped portion with circumferentially distributed apertures holding locking members in a radially displaceable way. The other freewheeling part includes circumferentially distributed recesses which correspond to the apertures. Also, the sleeve-shaped portion has an axially displaceable switching element. The switching element is pushed by a spring into a position in which the locking members are held in the recesses. Further, as a function of the speed, the switching element may be moved into a released position, via a switching device against the force of the spring. The switching device includes a switching cage and centrifugal masses which are radially displaceable as a function of the speed. The masses are supported on supporting faces of one of the freewheeling parts and the switching cage. Also, the masses are inclined relative to one another such that, under the effect of the centrifugal force, the switching cage is axially adjusted relative to the freewheeling parts.

Freewheeling devices are illustrated in DE-4027209.Cl, issued Aug. 28, 1990 and in the unpublished patent application 41 36 271.3, issued Nov. 4, 1991. U.S. Pat. No. 4,889,353 describes a state of the art drive assembly for a four wheel drive vehicle. The assembly has a viscous coupling which, via a freewheeling device, is either connected to, or disconnected from, the input end of the non-permanently driven wheels. Also, the assembly has two clamping member freewheeling units which are engaged up to a predetermined speed. The freewheeling units provide a non-rotating connection for both directions of rotation. Once a certain speed is exceeded, the clamping members of the clamping member freewheeling unit, which serves to transmit torque during reversing, are made ineffective. This ensures that if the rear wheels rotate faster than the front wheels, for example during braking, overtaking is possible. In this way, it is ensured that no braking moment is transmitted from the front wheels to the rear wheels and that even when the front wheels are overbraked, lateral stability of the vehicle is maintained.

It is known to use viscous couplings to connect non-permanently driven vehicle wheels. GB 1,357,106, issued Jun. 19, 1974 is such an example. The viscous coupling is arranged in the driveline between the front and rear wheels and it reacts to a speed differential between the front and rear wheels.

Viscous couplings used as so-called torque splitters, form another part of the state of the art, in which case they replace the rear wheel differential of the non-driven axle of a four wheel drive vehicle. Such an assembly is described in DE 37 08 193 A1, issued Oct. 1, 1987. This publication also describes freewheeling units which, during the driving operation, have a locking effect in both directions of rotation, but which release upon operation of the vehicle brake.

In the case of freewheeling units switched as a function of speed, e.g. freewheeling units switched via centrifugal force, the connecting speed may be passed through in the course of driving. However, when braking, on a smooth road surface, considerable speed differentials may occur between the axles, e.g. the front axle may have a locking effect. If the locked condition is eliminated by releasing the brake for example, the freewheeling unit again moves into the released position. If such resulting switching operations are repeated, it is possible for a switching noise to occur. Furthermore, such sudden changes may result in damage.

SUMMARY OF THE INVENTION

It is an object of the invention to provide a freewheeling device which substantially prevents the freewheeling unit from being transferred into the locked position at high speed differentials.

In accordance with the invention, the objective is achieved by the switching cage and its accommodating freewheeling part being rotatable relative to one another. Also, the switching cage and the other freewheeling part are rotatable relative to one another to a limited extent between two end positions. In the one end position, via the spring loading the switching cage, the cage and other freewheeling part are pushed into a non-rotating, form-fitting connection relative to one another. In the other end position, the cage and other freewheeling part are axially supported relative to one another in a force-locking way.

An advantage of this design is that during braking, for example on a smooth road surface especially with vehicles without an anti-locking device, the invention provides synchronization and thus as a connecting lock at high speed differentials. Connection of the form-fitting switching coupling will not be permitted unless the value falls below the predetermined speed differential.

Preferably, the centrifugal masses and the spring characteristics are adjusted to one another such that the speed effecting the released position is greater than the maximum driving speed resulting from the reversing mode of the vehicle. The centrifugal masses are designed as balls and the supporting faces of the associated freewheeling part extend substantially radially. The centrifugal masses, with the switching cage, are connected to the other coupling part via the force-locking connection, but also, via the form-fitting connection so that in the case of a speed differential between the two freewheeling parts, the switching cage rotates relative to the part supporting the centrifugal masses associated with the switching cage.

If the speed of the switching cage falls below the connecting speed, the closing force of the spring loading it becomes greater than the opening force of the centrifugal masses. The spring accelerates the switching cage from the force-locking connection into the form-fitting connection. The speed of the two freewheeling parts is almost identical when the form-fitting connection is established.

In a first embodiment of the invention, the switching cage or the freewheeling part is provided with an axial groove open towards one axial end. The respective other freewheeling part is provided with an opposed matching driving member. A synchronizing pin, which includes an axial groove, is firmly connected to the freewheeling part or the switching cage. In front of the axial groove, the synchronizing pin includes a rotary stop for the driving member with reference to the one end position. Also, the synchronizing pin includes a helical-type rotary ramp which supports the driving member in the other end position while being loaded by the spring.

When a speed differential exists between the two freewheeling parts, one of the two parts, e.g. the driving member or the rotary ramp, holds the switching cage back against the force of the spring. In the process, the driving member moves into an end position where it is axially supported on the rotary ramp. To displace the switching cage axially, it has to be rotated in accordance with the contour of the rotary ramp. Thus, the spring effects both an axial and a rotational acceleration of the switching cage. As long as the driving member is positioned on the rotary ramp, it supports a considerable amount of the spring force. In such a case, only the difference of the spring force, supporting force and the axially effective component of the centrifugal force is available for axially accelerating the switching cage. At the same time, part of the available axial force is required to rotationally accelerate the switching cage and the centrifugal masses.

The freewheeling unit can be locked only if, within the time in which the locking balls pass through the recesses corresponding to the bores, the switching element connected to the switching cage is transferred from the released position into the locked position. Otherwise, the switching element is pushed back into the released position by the unlocked locking members and the process, as described, is repeated until the differential speed has fallen below the predetermined connecting speed. If the speed differential is sufficiently low, the switching cage turns in accordance with the contour of the rotary ramp. The driving member moves into the axial groove and the switching element locks the locking members before they are able to run up on the flank of the recess of the associated freewheeling part so that they can again be pushed radially inwardly out of the recess. The freewheeling coupling is locked and, since the speed differential between the two freewheeling parts is now only small, the switching impact is only slight.

Preferably, in developing the first embodiment further, the switching cage, via a projection, is slidably positioned in a bore of one freewheeling part. The other freewheeling part includes the central synchronizing pin which also projects into the central bore from its other end. The driving member and the axial groove, together with the rotary stop connected in front of the groove and the rotary ramp are associated with the projection and the synchronizing pin.

Thus, it is possible to provide the projection with a bore and a transversely extending pin constituting a driving member. The synchronizing pin includes the axial groove, the rotary stop and the rotary ramp. To achieve the non-rotating connection, the driving member engages the axial groove of the synchronizing pin.

As an alternative solution, the switching cage, via a projection, movably engages a bore from one end of one of the freewheeling parts. The projection includes the axial groove, the rotary stop and the rotary ramp. The other freewheeling part is connected to a carrier for the driving member which extends into the bore from the other end.

In a further embodiment, to reduce the switching forces under torque, the switching element is movably held on the projection of the switching cage. The switching element includes movable locking balls in circumferentially distributed and substantially radially extending apertures of the switching cage. To lock the switching element, the balls are pushed, via a conical face of the projection, into an annular recess of one of the freewheeling parts.

In a further embodiment, the switching cage is firmly connected to a sleeve-shaped switching element. The switching element axially movably engages a freewheeling part. The freewheeling part includes a projection which engages a bore of the switching element. On its outer face, the freewheeling part includes circumferentially distributed radial projections. In one end position, each projection engages an axial groove of the switching element. In the other end position, the projections extend into a circumferential groove. The grooves have a rotary ramp extending along a helical line with the rotary ramps each being supported on the projections. In developing this solution further, the projections are formed by balls engaging recesses of the switching element so as to be immovable relative thereto.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
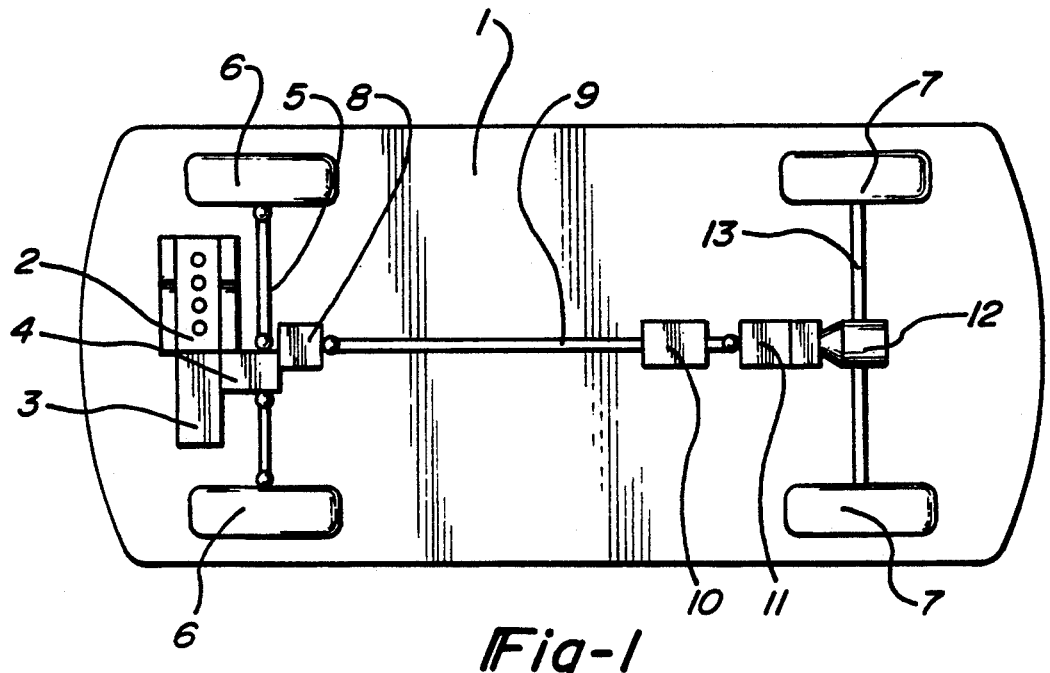
FIG. 1 is a schematic view of a four wheel drive vehicle provided with a freewheeling device in accordance with tho invention.
Figure 2:
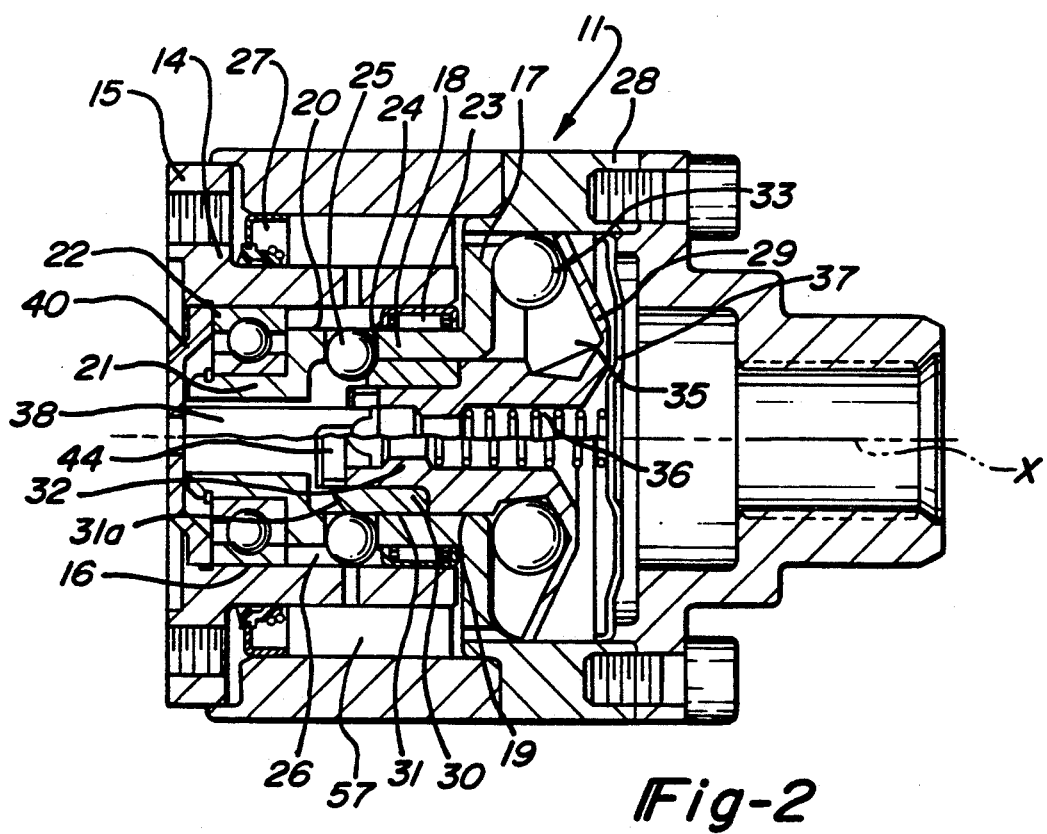
FIG. 2 is a longitudinal section view of a first embodiment of a freewheeling device.

FIG. 1 is a diagrammatic view of a vehicle 1 with its driveline. The engine 2 serves to drive the vehicle 1. The gearbox 3 drives the front axle differential 4 and, via the front wheel driveshafts 5, the front wheels 6. As far as the basic concept is concerned, the vehicle 1 is a front wheel drive vehicle. The drive for the rear axle and the associated rear wheels 7 is branched off from the front axle drive and thus from the drive of the front wheels 6. The distributor gear 8 is provided to branch off the rotational driving movement. The distributor gear drives the propeller shaft 9. A viscous coupling 10 is connected to one end of the freewheeling device 11 which is incorporated into the driveline of the propeller shaft 9. The freewheeling device 11 drives the input of the rear axle differential 12 which, via the rear wheel driveshafts 13, drives the rear wheels 7 of the motor vehicle 1. The subsequent FIGS. 2 to 9 illustrate varying embodiments of the freewheeling device 11.

The freewheeling device 11 according to FIGS. 2 to 5 includes an outer freewheeling part 14 and inner freewheeling part 17. The outer freewheeling part 14 includes a flange 15 connected to the output end of the viscous coupling 10. A bore 16 in the outer freewheeling part 14 rotatably receives the outer face 20 of the sleeve-shaped portion 18 of inner freewheeling part 17.

The sleeve-shaped portion 18 includes a bore 19. The sleeve-shaped portion 18 changes into a hollow journal 21. A bearing 22 is arranged on the hollow journal 21. The outer bearing ring of bearing 22 is accommodated in a corresponding bearing bore of the outer freewheeling part 14. The bearing 22 is a deep groove ball bearing. At a distance from the bearing 22, the outer face 20 of the sleeve-shaped portion 18 holds a needle bearing 23 which is also positioned in a bearing bore of the outer freewheeling part 14.

The inner freewheeling part 17 includes a casing which extends concentrically relative to the outer freewheeling part 14. A seal 27 is arranged between the casing and the outer freewheeling part 14. Additionally, the freewheeling unit 57 may be arranged between the casing of the outer freewheeling part 14 and the inner freewheeling part 17.

The inner freewheeling part 17 includes circumferentially distributed apertures 24 which receive radially movable locking members 25. The locking members 25, in the form of balls, engage the outer freewheeling part recesses 26, which are distributed in accordance with the apertures 24.

On its end projecting from the outer freewheeling part 14, the inner freewheeling part 17 includes a formed part constituting a flange 28. This flange 28, for example, serves to connect a connecting bushing to provide a connection with the gear input of the rear axle differential 12 according to FIG. 1.

Figure 5:
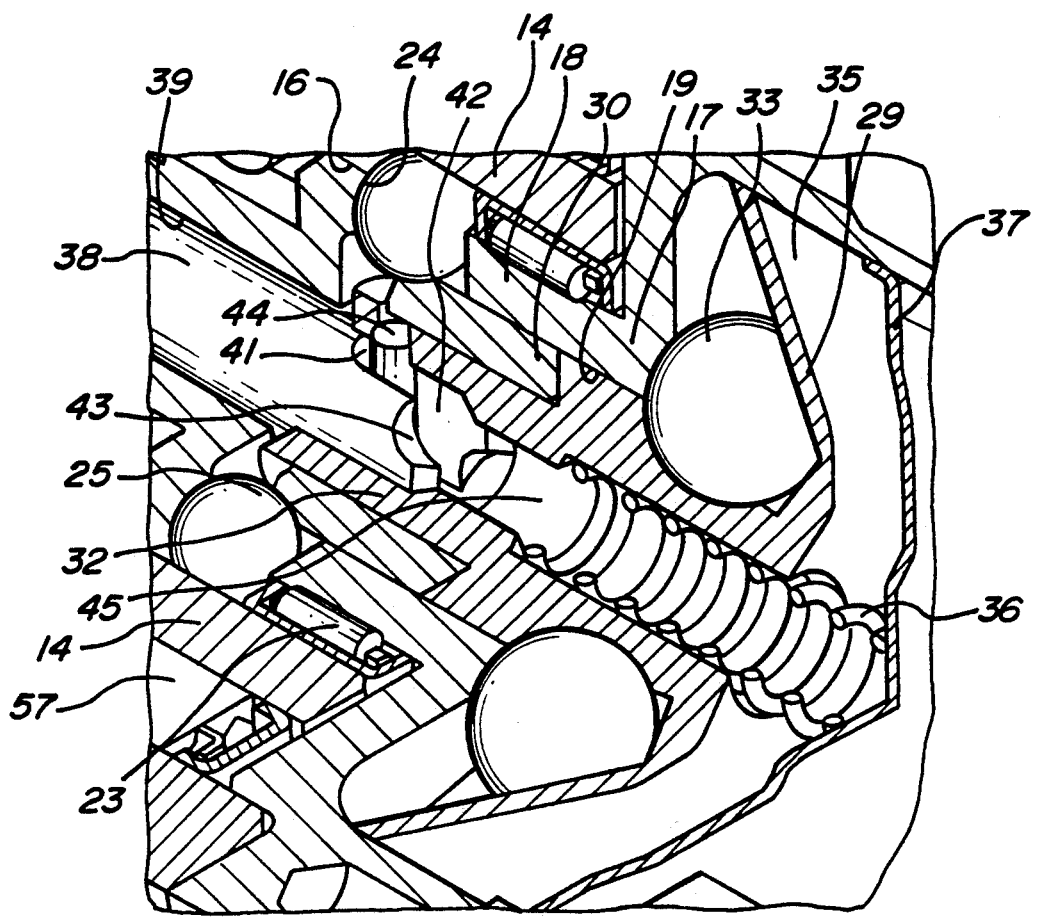
FIG. 5 is a view like FIG. 4 in the locked position.

A switching device includes a switching cage 29 which actuates a switching element 30 associated with the inner freewheeling part 17. The switching element 30, via its outer face 31, is movably received in the bore 19 of the sleeve-shaped portion 18. The switching element 30 has an inclined face 31a which acts on the locking members 25 to move the locking members 25 radially outwardly. The switching element 30 is received on a projection 32 of the switching cage 29. The switching cage 29 is loaded by a spring 36 which pushes the switching cage 29 with the switching element 30 into the locked position, displaced towards the left as illustrated in FIG. 5. The outer face 31 of the switching element 30 supports the locking members 25 so that they are held and enclosed in the apertures 24 and the associated recesses 26. In this position, the locking members 25 are unable to move inwardly into the locked position.

Figure 3:
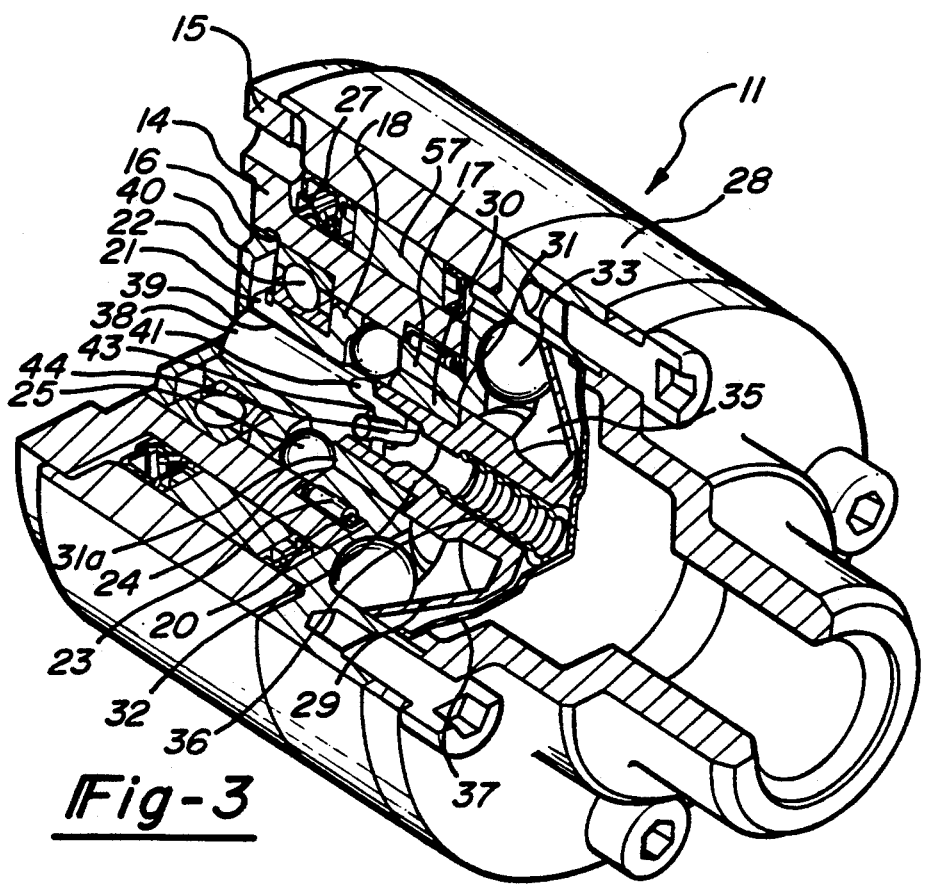
FIG. 3 is a perspective partially in section view of a freewheeling unit according to FIG. 2.
Figure 4:
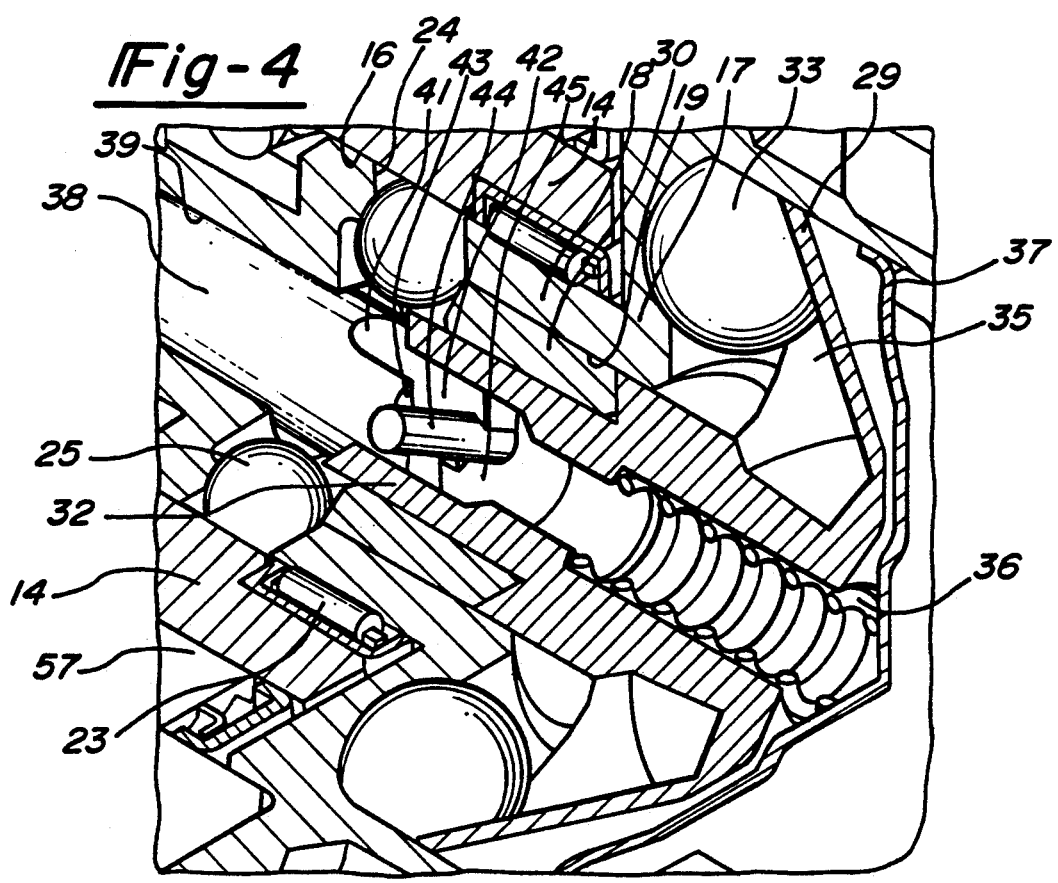
FIG. 4 is an enlarged view of FIG. 3 illustrating a released position of the locking members.

FIGS. 3 and 4 show the released position of the freewheeling device 11. The centrifugal masses 33, held in guiding tracks 35 of the switching cage 29, move the switching element 30 into the released position as illustrated in FIGS. 3 and 4. The guiding tracks 35 extend at an angle relative to the radially extending supporting face 34 of the inner freewheeling part 17. Thus, when the centrifugal masses 33 move in the guiding tracks 35 along the supporting face 34 of the inner freewheeling part 17, the switching cage 29, together with the switching element 30, is displaced from the locked position into the released position. The switching cage 29 is received in a hollow space of the inner freewheeling part 17.

Towards the outside, the hollow space is sealed by the cover 37 which, at the same time, serves as a supporting base for the spring 36. The other end of the spring 36 is supported on an annular shoulder of the projection 32 of the switching cage 29.

A central synchronizing pin 38 is arranged on the rotational axis X of the two freewheeling parts 14, 17. The synchronizing pin 38 is received in the bored step 39 of the inner freewheeling part 17. The synchronizing pin 38 is inserted into the bore 39 from the end positioned opposite the switching cage 29. One end of the pin 38 is attached to a cover 40 which is firmly connected to the outer freewheeling part 14. The projection 32 of the switching cage 29 includes a bore 45 which faces the synchronizing pin 38. The end of the synchronizing pin 38 extends into the bore 45. In the region of overlap between the projection 32 and the synchronizing pin 38, a driving member 44, in the form of a pin, extends transversely to the bore 45. The driving member 44 is firmly connected to the projection 32 of the switching cage 29. The driving member 44 is designed as a cylindrical pin.

In the position as illustrated in FIGS. 3 and 4, e.g. in the released position, the pin 44 is supported on rotary ramps 43. The ramps 43 are spiral-shaped and change into the axially extending groove 41. Support is provided under the force of the spring 36 which, when the speed is reduced and the centrifugal masses 33 move radially inwardly, ensure in the rotational sense, a force is applied to the switching cage 29 so that the cage is turned until it comes to rest against the other rotary stops 42. In this position, the driving member 44 is aligned relative to the axial groove 41 and is able to move into it. At the same time, the switching element 30 is moved towards the left and transfers the locking members 25 radially outwardly to engage the recesses 26 of the outer freewheeling part 14.

The pitch angle of the helical is preferably greater than the self-inhibition angle. However, in cases where couplings with play, for example draw key couplings, are provided, the pitch angle may be smaller than the self-inhibition angle. The locked position is illustrated in FIG. 5.

Figure 6:
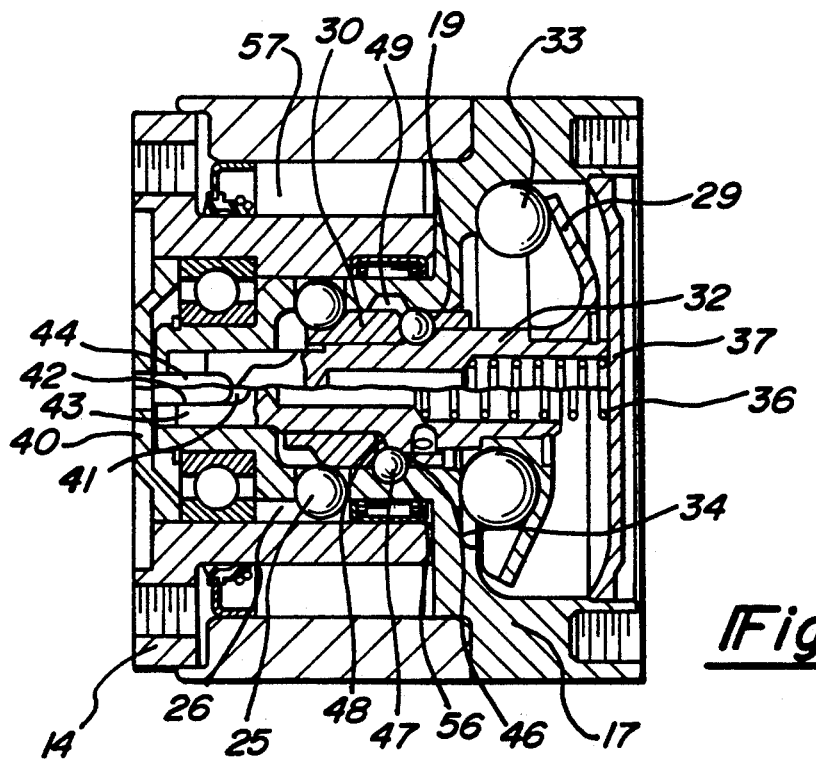
FIG. 6 is a longitudinal section view of a second embodiment of the present invention.

The basic concept of the freewheeling coupling illustrated in FIG. 6 corresponds to that described in connection with FIGS. 2 to 5. One difference which exists is the driving member 44, the rotary ramps 43 and rotary stops 42 have been exchanged. The driving member 44 is associated with the outer freewheeling part 14. It is connected to the cover 40 which is attached to the outer freewheeling part 14. The upper half of FIG. 6 shows the freewheeling unit in the released position and the lower half shows it in the locked position.

In this case, the rotary stops 42 and rotary ramps 43 and the axial groove 41 are associated with the projection 32 of the switching cage 29. A further difference as compared to the designs according to FIGS. 2 to 5 is that the switching element 30 is axially movably arranged on the outer face of the projection 32 in the direction of the rotational axis. The switching element 30 includes circumferentially distributed apertures 46. Locking balls 47 are arranged in a radially displaceable way in the apertures 46. In the released position, the locking balls 47 are in their radially inner position, e.g. they are positioned inside the bore 19 of the inner freewheeling part 17. In the process, they move into a free space existing between the outer face of the projection 32, guiding the switching element 30 and a conical enlarged step-like face 48 at the projection 32.

If the speeds of the inner freewheeling part 17 and the outer freewheeling part 14 converge below the predetermined switching speed, the centrifugal masses 33 at the stepped supporting face 34 escape radially inwardly from the position illustrated in the upper half of FIG. 6 into the position illustrated in the lower half of FIG. 6. As a result and as already explained in connection with FIGS. 2 to 5, a rotational force is applied to the switching cage 29. Thus the force is applied to the projection 32 until the driving member 44 is able to engage the axial groove 41 of the projection 32. The switching element 30 is moved towards the left together with the projection 32. In the process, a force is applied to the locking members 25 which escape radially outwardly out of the apertures 24 into the recesses 26 of the outer freewheeling part 14. In the locked position, the locking members 25 are supported radially inwardly against the outer face of the switching element 30. At the same time, with the support of the conical faces 48, the locking balls 47 in the apertures 46 move radially outwardly into an annular recess 49 of the inner freewheeling part 17. In the locked position, the balls 47 are supported on the outer face of the projection 32 for locking purposes.

By arranging the locking balls 47 in connection with the conical supporting face 48 and by displaceably arranging the switching element 30 on the projection 32, it is possible to form a gearing means so that, under load conditions, the switching forces are reduced. A reduction occurs in the force which is required to transfer the switching element 30 from the locked position illustrated in the lower half of FIG. 6 into the released position shown in the upper half of FIG. 6.

Figure 7:
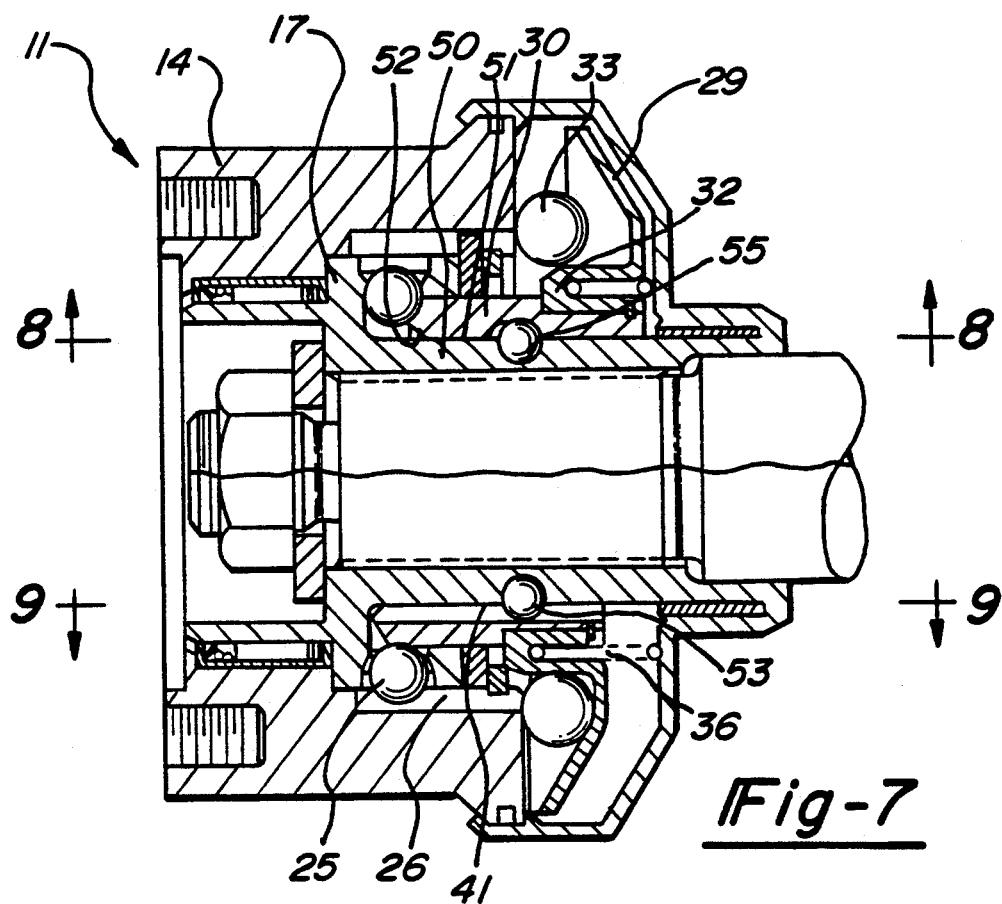
FIG. 7 is a longitudinal section view of a third embodiment of the present invention.
Figure 8:
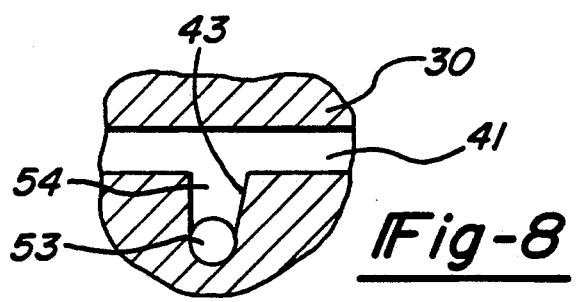
FIG. 8 is a section view of FIG. 7 along line 8-8 thereof.

FIG. 7 shows a further embodiment of a freewheeling unit. The upper half shows the released position and the lower half the locked position. In the upper half, the locking members 25 are in their radially inner position. In the lower half of FIG. 7, the locking members 25 engage the recesses 26 of the freewheeling part 14. The freewheeling part associated with the switching cage 29 and the centrifugal masses 33 has been given the reference number 14. The freewheeling part 17 includes a projection 50 which extends through the switching element 30 attached to the projection 32 of the switching cage 29. The freewheeling part 17, on its outer face 52, includes circumferentially distributed recesses 55 which are positioned opposite the wall of the bore 51. The recesses 55 serve to receive balls in the form of stationary projections 53. The bore 51 of the switching element 30 includes corresponding circumferentially distributed axial grooves 41 which may engage the projections 53 and with circumferentially extending grooves 54. The circumferential grooves include rotary ramps 43 which extend at a helical-like angle. The axial groove 41 forms the rotary stop in the opposite direction of rotation. FIG. 8 which forms part of the upper half of FIG. 7 shows that the projection 53 is located in the circumferential groove 54. Via the spring 32 support is provided on the rotary ramp 43.

Figure 9:
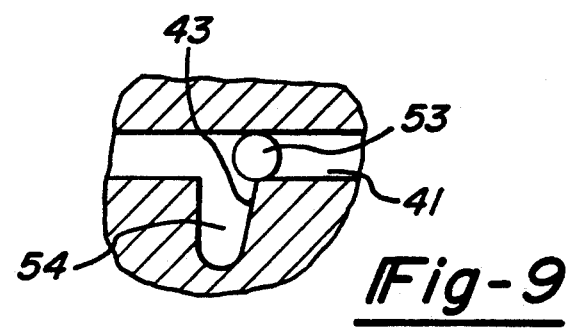
FIG. 9 is a section view of FIG. 7 along line 9-9 thereof.

If the speeds of the two freewheeling parts 14 and 17 converge below a predetermined switching speed such that a rotational force can be applied to the switching element 30 via the spring 36, the switching element 30 is turned in such a way that the projection 53 associated with the freewheeling part 17 is now positioned in the region of the axial groove 41. The switching element 30 is then able to move into the locked position as illustrated in the lower half of FIG. 7, with the projection 53 being positioned in the axial groove 41 as shown in FIG. 9.

While the above detailed description describes the preferred embodiment of the present invention, the invention is susceptible to modification, variation, and alteration without deviating from the scope and fair meaning of the subjoined claims.

I claim:

1. A lockable freewheeling device, for providing a driving connection between non-permanently driven wheels of a rear axle and wheels of a permanently driven front axle of a motor vehicle, the freewheeling device comprising:

two freewheeling parts, one of said parts being driven and other one intended to pass on the rotational movement, one of said freewheeling parts including a sleeve-shaped portion with circumferentially distributed apertures, locking members are held in said apertures in a radially displaceable way, the other freewheeling part including circumferentially distributed recesses corresponding to said apertures, a switching element being axially displaceable and being coupled with said sleeve-shaped portion, a spring pushing said switching element into a position where said locking members are held in said recesses and, as a function of speed, said locking members may be moved into a releasing position via a switching device moving against the force of the spring, said switching device including a switching cage and centrifugal masses, said masses being radially displaceable as a function of speed and being supported on supporting faces of one of the freewheeling parts and said switching cage, said faces being inclined relative to one another in such a way that, under the effect of the centrifugal force, the switching cage being axially adjusted relative to the freewheeling part being rotatable relative to one another and said switching cage and other freewheeling part being rotatable relative to one another to a limited extent between two end positions, in one end position, via said spring loading the switching cage, said switching cage and freewheeling part being pushed into a non-rotating, form-fitting connection relative to one another and, in the other end position, being axially supported relative to one another in a force-locking way.

2. The freewheeling device according to claim 1, wherein said centrifugal masses and spring characteristics are adjusted to one another such that a speed effecting the released position is greater than maximum driving speed resulting from a reversing mode of the motor vehicle.

3. The freewheeling device according to claim 1, wherein said centrifugal masses are balls and said supporting faces of the associated freewheeling part extend essentially radially.

4. The freewheeling device according to claim 1, wherein said switching cage serves as a carrier of a separated switching element.

5. The freewheeling device according to claim 1, wherein said switching cage or freewheeling part is provided with an axial groove open towards one axial end and the other respective part having an opposed matching driving member and a synchronizing pin including an axial groove and being firmly connected to the freewheeling part or the switching cage and in front of said axial groove, having a rotary stop for the driving member with reference to one end position and a helical-type rotary ramp supporting said driving member while being loaded by the spring in the other end position.

6. The freewheeling device according to claim 5, wherein said switching cage, via a projection, is slidably positioned in a central bore of the one freewheeling part and the other freewheeling part including the central synchronizing pin, said synchronizing pin projecting into the central bore from its other end and said driving member and axial groove, together with said rotary stop connected in front of said groove and said rotary ramp being associated with said projection and said synchronizing pin.

7. The freewheeling device according to claim 6, wherein said projection is provided with a bore and a transversely extending pin constituting a driving member, said synchronizing pin including said axial groove, rotary stop and rotary ramp and for achieving the non-rotating connection, said driving member engaging said axial groove of said synchronizing pin.

8. The freewheeling device according to claim 5, wherein said switching element being movably held on the projection of said switching cage, circumferentially distributed and substantially radially extending apertures on said cage holding movable locking balls for locking the switching element, said balls being pushed via a conical face of the projection into an annular recess of one freewheeling part.

9. The freewheeling device according to claim 1, wherein said switching cage, via a projection, movably engaging a bore of one freewheeling part from one end, said projection including the axial groove, rotary stop and rotary ramp and said other freewheeling part being connected to a carrier for the driving member extending into the bore from its other end.

10. The freewheeling device according to claim 1, wherein said switching cage is firmly connected to a sleeve-shaped switching element, said switching element axially movably engaging one of the freewheeling parts, said freewheeling part including a projection engaging a bore of the switching element and, on said freewheeling part outer face including circumferentially distributed radial projections, in the one end position, each radial projection engaging an axial groove of the switching element, in the other end position, said radial projections extending into a circumferential groove having a rotary ramp extending along a helical line, with the rotary ramps each being supported on the projections.

11. The freewheeling device according to claim 10, wherein said radial projections are formed by relatively immovable balls engaging recesses of the switching element.

* * * * *

UNITED STATES PATENT AND TRADEMARK OFFICE
CERTIFICATE OF CORRECTION

PATENT NO. : 5,333,711
DATED : August 2, 1994
INVENTOR(S) : Wolfgang Beigang

It is certified that error appears in the above-indentified patent and that said Letters Patent is hereby corrected as shown below:

Column 8, line 39, Claim 1, after "freewheeling", insert --parts and said switching cage and its accommodating freewheeling--

Column 10, line 24, Claim 10, before "projections", insert --radial--

Signed and Sealed this

Ninth Day of May, 1995

Attest:

BRUCE LEHMAN

*Attesting Officer*     *Commissioner of Patents and Trademarks*